(12) United States Patent
Fu et al.

(10) Patent No.: US 12,253,640 B2
(45) Date of Patent: Mar. 18, 2025

(54) TARGET-ORIENTED SEISMIC ACQUISITION METHOD AND APPARATUS, MEDIUM AND DEVICE

(71) Applicant: CHINA UNIVERSITY OF PETROLEUM (East China), Qingdao (CN)

(72) Inventors: Liyun Fu, Qingdao (CN); Zhiwei Wang, Qingdao (CN); Wei Wei, Qingdao (CN); Weijia Sun, Qingdao (CN)

(73) Assignee: CHINA UNIVERSITY OF PETROLEUM (East China), Qingdao (CN)

( * ) Notice: Subject to any disclaimer, the term of this patent is extended or adjusted under 35 U.S.C. 154(b) by 481 days.

(21) Appl. No.: 17/698,099

(22) Filed: Mar. 18, 2022

(65) Prior Publication Data

US 2023/0228894 A1 Jul. 20, 2023

(30) Foreign Application Priority Data

Jan. 18, 2022 (CN) .......................... 202210053628.2

(51) Int. Cl.
*G01V 1/28* (2006.01)
*G01V 1/30* (2006.01)

(52) U.S. Cl.
CPC ............... *G01V 1/282* (2013.01); *G01V 1/301* (2013.01)

(58) Field of Classification Search
CPC .......... G01V 1/282; G01V 1/301; G01V 1/28; G01V 1/30; G01V 1/181
See application file for complete search history.

(56) References Cited

U.S. PATENT DOCUMENTS

2023/0228894 A1* 7/2023 Fu ........................... G01V 1/28
367/73

FOREIGN PATENT DOCUMENTS

| CN | 101937102 A | * | 1/2011 |
| CN | 103823238 A |   | 5/2014 |
| CN | 106873031 B | * | 1/2019 |
| CN | 109683199 A |   | 4/2019 |
| CN | 110058309 A | * | 7/2019 |
| CN | 110579798 A |   | 12/2019 |
| CN | 114442145 A | * | 5/2022 | ............. G01V 1/282 |
| CN | 117452496 A | * | 1/2024 |

* cited by examiner

*Primary Examiner* — Daniel Pihulic

(57) ABSTRACT

The present invention relates to a target-oriented seismic acquisition method and apparatus, a medium and a device. The target-oriented seismic acquisition method comprises the steps of: giving parameters of an initial velocity model and a three-dimensional seismic layout aiming to an underground target position; conducting wave field continuation and focusing analysis on the three-dimensional seismic layout, and calculating distribution of seismic energy on the ground in an underground target region; conducting normalization processing on distribution of the seismic energy on the ground, and then conducting level partitioning to obtain a primary energy region and a secondary energy region; adding the number of shot points in the primary energy region to achieve target-oriented acquisition, and obtaining a target-oriented inhomogeneous laying acquired data imaging result. By using the method of the present invention, automatic feedback adjustment on excitation and receiving sites and parameters thereof is achieved.

4 Claims, 7 Drawing Sheets

TARGET-ORIENTED SEISMIC ACQUISITION METHOD AND APPARATUS, MEDIUM AND DEVICE

CROSS-REFERENCE TO RELATED APPLICATIONS

The application claims priority to Chinese patent application No. 202210053628.2, filed on Jan. 18, 2022, the entire contents of which are incorporated herein by reference.

TECHNICAL FIELD

The present invention relates to a target-oriented seismic acquisition method and apparatus, a medium and a device and belongs to the field of optimized design on three-dimensional observation systems for seismic oil exploration.

BACKGROUND

Three-dimensional seismic exploration is a major means for oil and gas exploration; and the underground structural features and lithologic and physical parameters can be obtained only when flows of processing, imaging, inversion and the like are conducted on data for seismic acquisition. Therefore, the quality of the data for seismic acquisition is crucial to recognition in definition of an underground target body.

Traditional seismic acquisition is to homogeneously laying shot points and receivers on the ground. The underlying theory is that assuming that an underground stratum as a horizontal medium, a seismic wave illuminates homogeneously; however, an actual stratum cannot be horizontal. In regard to most of horizontal strata, seismic waves excited by the shot points on the ground can be reflected at a small angle and are received by the receivers; however, the seismic waves are reflected at a high angle due to high dipping fractures, a signal cannot be received by the receivers on the ground, and steep dip strata and fractures cannot be shown clearly. Thus, how to enable the seismic waves at the high angle to be received by the receivers on the ground is the core problem to be troubleshoot in the aspect of the seismic acquisition technology.

SUMMARY

Aiming to the above technical problems, the present invention provides a target-oriented seismic acquisition method and apparatus, a medium and a device. The method of the present invention abandons the traditional idea of homogeneously laying an acquisition observation system on the ground. Since high-angle waves excited in a ground observation range cannot be received by the receivers on the ground because of the high-dip fault in the ground. The waves are changed to be excited beyond the ground observation range, and the high-angle waves reflected by a steep dip interface may be received by the receivers in the ground observation range. In addition, by adding the number of shot points in partial regions, under the conditions of the current seismic acquisition observation system, more effective underground information is obtained, and a project design on a seismic layout aiming to a specific geologic target body is finally completed, which provides optimal initial data to subsequent processing, explanation, inversion and the like of seismic data.

In order to achieve the above objective, the present invention employs the following technical solution:

A target-oriented seismic acquisition method, comprising the steps of:

giving parameters of an initial velocity model and a three-dimensional seismic layout aiming to an underground target position;

conducting normalization processing on distribution of the seismic energy on the ground, and then conducting level partitioning to obtain a primary energy region and a secondary energy region;

adding the number of shot points in the primary energy region to achieve target-oriented acquisition, and obtaining a target-oriented inhomogeneous laying acquired data imaging result; and comparing a conventional acquired data imaging result with the target-oriented inhomogeneous laying acquired data imaging result.

wherein the conducting wave field continuation and focusing analysis on the three-dimensional seismic layout, and calculating distribution of the seismic energy on the ground in the underground target region specifically comprises the steps of:

conducting large-step continuation by using FFD, and obtaining wave fields in various small layers between large steps by combining with Born-Kirchhoff interpolation at the same time; after completing wave field continuation, calculating the focusing attribute of receivers and the focusing attribute of shot points of the three-dimensional seismic layout, and then quantitatively analyzing an expected resolution and an AVP attribute of the whole three-dimensional seismic layout; and calculating distribution of the seismic energy on the ground in the underground target region.

wherein the conducting normalization processing on distribution of the seismic energy on the ground, and then conducting level partitioning specifically comprises the steps of:

with an energy drop $1/e$ as a limit, partitioning the seismic energy into the primary energy region if the energy drop is above the limit and the seismic energy into the secondary energy region if the energy drops to the energy drop $½$ below the limit.

A second aspect of the present invention provides a target-oriented seismic acquisition apparatus, comprising:

a first processing unit for giving the parameters of the initial velocity model and the three-dimensional seismic layout aiming to the underground target position;

a second processing unit for conducting wave field continuation and focusing analysis on the three-dimensional seismic layout and calculating distribution of the seismic energy on the ground in the underground target region;

a third processing unit for conducting normalization processing on distribution of the seismic energy on the ground and then conducting level partitioning to obtain the primary energy region and the secondary energy region;

a fourth processing unit for adding the number of shot points in the primary energy region to achieve target-oriented acquisition and obtaining the target-oriented inhomogeneous laying acquired data imaging result; and a fifth processing unit for comparing the conventional acquired data imaging result with the target-oriented inhomogeneous laying acquired data imaging result.

A third aspect of the present invention provides a computer readable storage medium. A computer program is stored in the computer readable storage medium; and when the computer program is executed by a processor, the steps of the above target-oriented seismic acquisition method are implemented.

A fourth aspect of the present invention provides a computer device, comprising a memory, a processor and computer programs which are stored in the memory and may run on the processor. When the processor executes the computer programs, the steps of the above target-oriented seismic acquisition method are implemented.

As employing the above technical solution, the present invention has the following advantages that:

1. Wave field recursive calculation is conducted by combining Born-Kirchhoff small-step wave field interpolation (BK interpolation) with large-step FFD continuation (FFD-BK for short), and a simulation speed is greatly increased.

2. Based on the principle of wave propagation, target illumination is set to be strongest, and the optimization problem is solved to obtain optimal ground excitation and receiving sites, from which a design method for underground target-oriented seismic acquisition with inhomogeneous ground laying is formed; and therefore, automatic feedback adjustment on excitation and receiving sites and parameters thereof is achieved.

3. Compared with conventional acquired data imaging, by using target-oriented inhomogeneous laying acquired data imaging, a high-dip structure and the fault block imaging features are obviously improved; an acquisition range of the high-angle seismic waves is increased to an angle of nearly 60 degrees from an angle of 45 degrees; and the detectivity of the seismic acquisition technology to a complex structure is greatly improved. The present invention may be widely applied to the technical field of optimized designs on three-dimensional observation systems for seismic oil exploration.

DETAILED DESCRIPTION OF THE EMBODIMENTS

Figure 1:
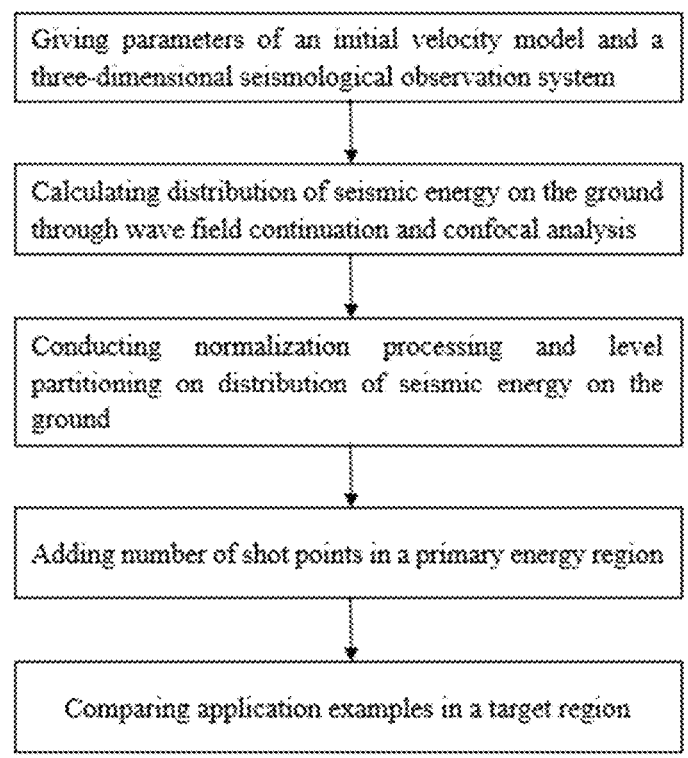
FIG. 1 is a flowchart of a target-oriented seismic acquisition method according to an embodiment of the present invention.

As shown in FIG. 1, the target-oriented seismic acquisition method provided by the present invention comprises the steps of:

1) Giving parameters of an initial velocity model and a three-dimensional seismic layout aiming to an underground target position.

Figure 2:
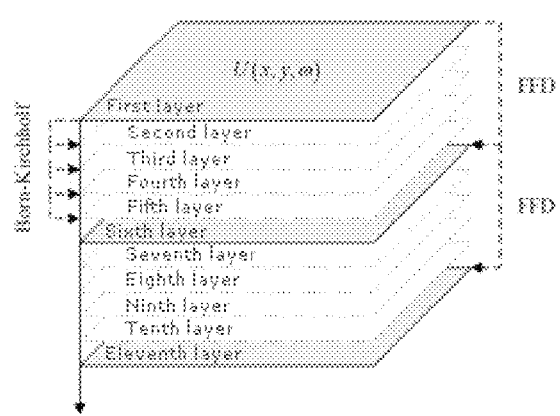
FIG. 2 is a schematic diagram of focal beam analysis in complex media according to the embodiment of the present invention.

2) Conducting large-step continuation by using FFD, and obtaining wave fields in various small layers between large steps by combining with Born-Kirchhoff interpolation at the same time (as shown in FIG. 2, it is made every 5 layers). The FFD large-step continuation algorithm belongs to the prior art (referring to the Patent Application No. 201010557332.1, entitled with "Migration Noise Acquisition Method And Apparatus For Three-Dimensional Seismic Layout" in detail), and thus FFD large-step continuation will not be described herein. As the calculated amount is huge by purely using the FFD wave field continuation technology, the present invention proposes the technology combining FFD with Born-Kirchhoff interpolation, and a wave field u(r) is obtained by Born-Kirchhoff interpolation deduced by a Lippmann-Schwinger integral formula:

$$u(r) = \int_{z}^{z+\Delta z} \frac{ik_0}{2\pi r} \exp(ik_0 \Delta z(n-1)) \exp(ik_0 \Delta r) u_s(r) dr$$

wherein
$r = \sqrt{(x_1-x_2)^2 + (y_1-y_2)^2 + \Delta z^2}$

In the formula, n is a reflection coefficient; $k_0$ is a background wave number; i is a pure imaginary number; the position of a target point before continuation is $(x_1, y_2)$; the position of the target point after continuation is $(x_2, y_2)$; an ordinate of the target point before continuation is z; a difference between ordinates of the target point before and after continuation is $\Delta z$; and $u_s(r)$ is a wave field before continuation.

Figure 3:
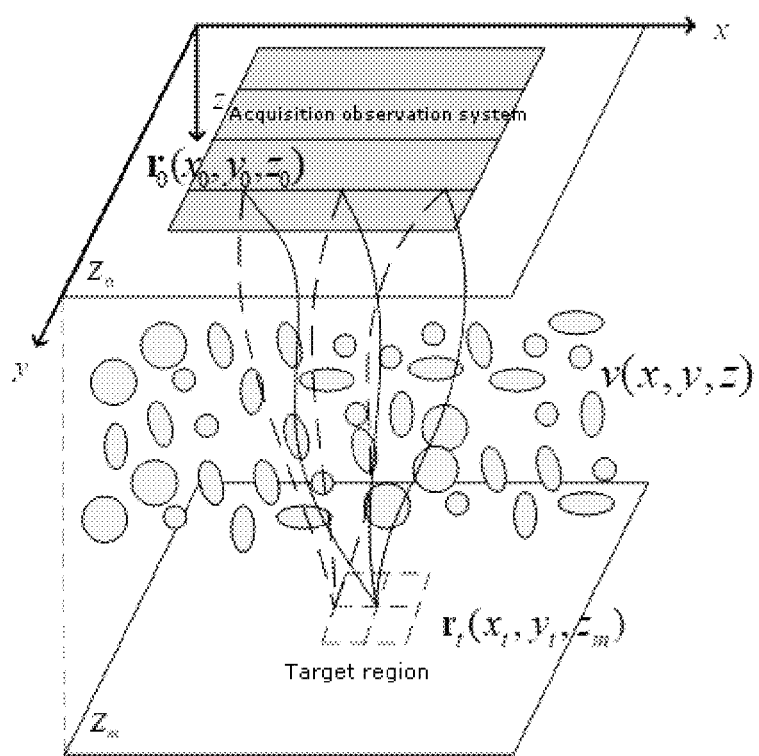
FIG. 3 is a schematic diagram of algorithm combining Fourier finite difference (FFD) large-step with Born-Kirchhoff small-step continuation according to the embodiment of the present invention.

As shown in FIG. 3, the wave field propagates to the receiver at the position zo on the ground from a seismic source grid point at the target point $r_t$ through an inhomogeneous medium v(x,y,z). The focusing property of the observation system at the target point is estimated by inverse continuation of an observed wave field. $Z_0$ is an ordinate of the ground, and $z_m$ is an ordinate of the target point.

Figure 4:
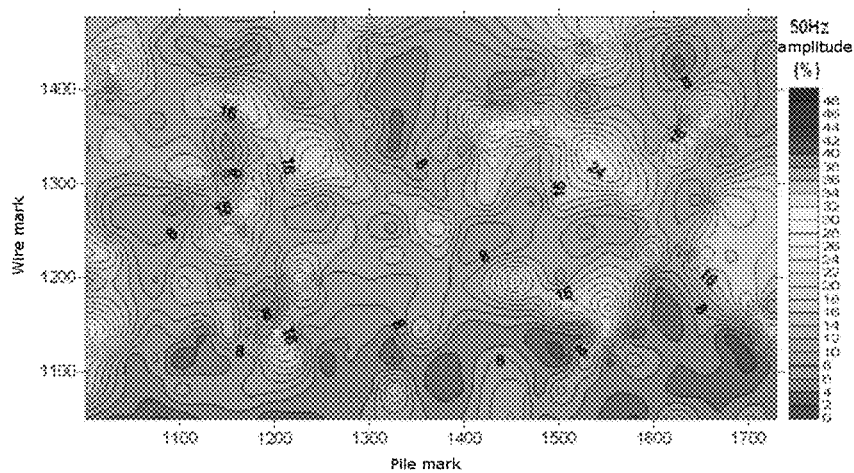
FIG. 4 shows distribution of seismic energy on the ground in an underground target region according to the embodiment of the present invention.

After wave field continuation is completed, the focusing property of the receivers and the focusing property of the shot points of the three-dimensional seismic layout are calculated (the detailed calculation or analysis process of the focusing property of the receivers and the focusing property of the shot points refers to the Patent Application No. 201710081114.7, entitled with "Quantitative Analysis Evaluation Method For Vertical Resolution Of Three-Dimensional Seismic Layout"). Therefore, an expected resolution and an AVP attribute of the whole observation system in a spatial frequency domain and a Radon domain are obtained respectively, and distribution of ground energy in the underground target region is given (as shown in FIG. 4).

In this step, the whole continuation based on the three-dimensional seismic layout is completed through Fourier finite difference (FFD) large-step continuation and Born- Kirchhoff operator small-step wave field interpolation; and FFD large-step continuation belongs to the prior art and will not be described herein. Compared with a Kirchhoff integral formula under the homogeneous condition, for a Born-Kirchhoff integral formula under incident waves at a small angle, a slowness disturbance correction term is added; and therefore, an operator can be adapted to a lateral variation of a velocity of a medium. After wave field continuation, focal beam analysis is conducted through the receivers, the shot points and the underground target body to solve a resolution function and an amplitude versus ray-parameter (AVP) function. Focal beam analysis belongs to the prior art (referring to the Patent Application No. 201710081114.7, entitled with "Quantitative Analysis Evaluation Method For Vertical Resolution Of Three-Dimensional Seismic Layout" in detail), which will not be described herein.

3) Conducting normalization processing on distribution of the seismic energy on the ground, and then conducting level partitioning. With an energy drop 1/e as a limit, the seismic energy is partitioned into the primary energy region if the energy drop is above the limit; and the seismic energy is partitioned into the secondary energy region if the energy drops to the energy drop ½ below the limit.

Figure 5:
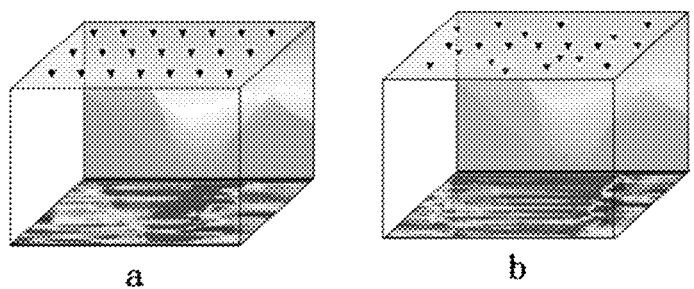
FIG. 5 shows schematic diagrams of energy distribution according to the embodiment of the present invention, wherein a is a schematic diagram of energy distribution corresponding to conventional shot points, and b is a schematic diagram of energy distribution corresponding to shot points after being added/adjusted in position.

4) In addition to the conventionally designed shot points and receivers, adding the number of the shot points in the primary energy region to achieve target-oriented acquisition (as shown in FIG. 5), wherein the design solution serves as a basis for improving the design on the three-dimensional seismic layout.

Firstly, the positions of the shot points and the receivers are given to form a design method for underground target-oriented inhomogeneous laying seismic acquisition, i.e. "adding the number of the shot points in the primary energy region" described in the step 4).

A result obtained herein is data for seismic acquisition. The result is that after the design of the adjusted shot points and receivers, data acquisition can be conducted; and imaging results shown on the right side of FIG. 6 and on the right side of FIG. 7 may be obtained by seismic processing and imaging of the acquired data Imaging diagrams on the left side of FIG. 6 and on the left side of FIG. 7 show that the shot points and the receivers are not adjusted to form a homogeneously laid observation system. Therefore, results on the left side of FIG. 6 and on the left side of FIG. 7 may be obtained by seismic processing and imaging of the acquired data.

Figure 6:
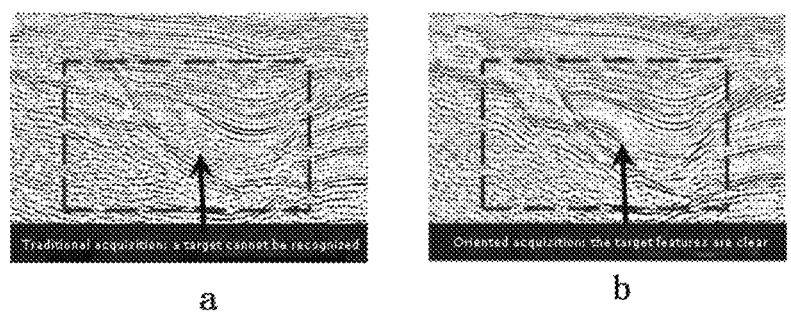
FIG. 6 shows imaging section comparison on data obtained after target-oriented acquisition (b) according to the embodiment of the present invention and traditional acquisition (a) —taking a certain target region in Zhongyuan oil field as an example.
Figure 7:
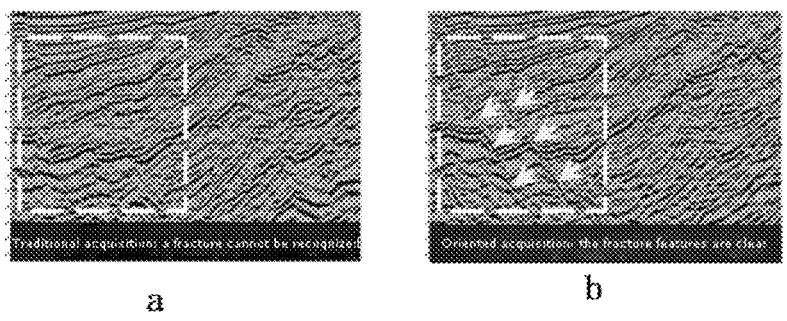
FIG. 7 shows imaging section comparison on data obtained after target-oriented acquisition (b) according to the embodiment of the present invention and traditional acquisition (a) —taking a certain target region in Dagang oil field as an example.

5) Applying the above analysis method to an actual region, and comparing a conventional acquired data imaging result with the target-oriented inhomogeneous laying acquired data imaging result (as shown in FIG. 6 and FIG. 7). From FIG. 6 and FIG. 7, a target and a fracture cannot be recognized by using the traditional method; whereas by employing the method of the present invention, the target features and the fracture features may be recognized clearly.

A second aspect of the present invention provides a target-oriented seismic acquisition apparatus, comprising:
 a first processing unit for giving the parameters of the initial velocity model and the three-dimensional seismic layout aiming to the underground target position;
 a second processing unit for conducting wave field continuation and focusing analysis on the three-dimensional seismic layout and calculating distribution of the seismic energy on the ground in the underground target region;
 a third processing unit for conducting normalization processing on distribution of the seismic energy on the ground and then conducting level partitioning to obtain the primary energy region and the secondary energy region;
 a fourth processing unit for adding the number of shot points in the primary energy region to achieve target-oriented acquisition and obtaining the target-oriented inhomogeneous laying acquired data imaging features; and
 a fifth processing unit for comparing the conventional acquired data imaging result with the target-oriented inhomogeneous laying acquired data imaging features.

A third aspect of the present invention provides a computer readable storage medium. A computer program is stored in the computer readable storage medium; and when the computer program is executed by a processor, the steps of the above target-oriented seismic acquisition method are implemented.

A fourth aspect of the present invention provides a computer device, comprising a memory, a processor and computer programs which are stored in the memory and may run on the processor. When the processor executes the computer programs, the steps of the above target-oriented seismic acquisition method are implemented.

The present invention makes descriptions according to the method and the device (system) of the specific implementation and a flowchart and/or a block diagram of a computer program product. It should be understood that each flow and/or block in the flowchart and/or the block diagram as well as combination of flows and/or blocks in the flowchart and/or the block diagram may be implemented by instructions of the computer programs. These instructions of the computer programs may be provided to a processor of a general-purpose computer, a special-purpose computer, an embedded processor or other programmable data processing devices to produce a machine; and therefore, an apparatus for achieving specified functions in one or more flows in the flowchart or one or more blocks in the block diagram is produced through the instructions executed by the processor of the general-purpose computer or other programmable data processing devices.

These instructions of the computer programs may further be stored in a computer readable memory which can guide the computer or other programmable data processing devices to work in a specific mode; and therefore, an article of manufacture comprising an instruction apparatus is produced by the instructions stored in the computer readable memory. The instruction apparatus achieves the specified functions in one or more flows in the flowchart or one or more blocks in the block diagram.

These instructions of the computer programs may further be loaded into the computer or other programmable data processing devices; and therefore, a series of operation steps are executed on the computer or other programmable devices to generate processing implemented by the computer, and then the instructions executed on the computer or other programmable devices provide the steps for achieving the specified functions in one or more flows in the flowchart or one or more blocks in the block diagram.

What is claimed is:
1. A target-oriented seismic acquisition method, comprising the steps of:
 giving parameters of an initial velocity model and a three-dimensional seismic layout aiming to an underground target position;

conducting wave field continuation and focusing analysis on the three-dimensional seismic layout, and calculating distribution of seismic energy on the ground in an underground target region;

conducting normalization processing on distribution of the seismic energy on the ground, and then conducting level partitioning to obtain a primary energy region and a secondary energy region;

adding the number of shot points in the primary energy region to achieve target-oriented acquisition, and obtaining a target-oriented inhomogeneous laying acquired data imaging result; and comparing a conventional acquired data imaging result with the target-oriented inhomogeneous laying acquired data imaging result.

2. The target-oriented seismic acquisition method according to claim 1, wherein the conducting wave field continuation and focusing analysis on the three-dimensional seismic layout, and calculating distribution of the seismic energy on the ground in the underground target region specifically comprises the steps of:

conducting large-step continuation by using FFD, and obtaining wave fields in various small layers between large steps by combining with Born-Kirchhoff interpolation at the same time; after completing wave field continuation, calculating the focusing attribute of receivers and the focusing attribute of shot points of the three-dimensional seismic layout, and then quantitatively analyzing an expected resolution and an AVP attribute of the whole three-dimensional seismic layout; and calculating distribution of the seismic energy on the ground in the underground target region.

3. The target-oriented seismic acquisition method according to claim 1, wherein the conducting normalization processing on distribution of the seismic energy on the ground, and then conducting level partitioning specifically comprises the steps of:

with an energy drop $1/e$ as a limit, partitioning the seismic energy into the primary energy region if the energy drop is above the limit and the seismic energy into the secondary energy region if the energy drops to the energy drop $1/2$ below the limit.

4. A non-transitory computer readable storage medium, wherein a computer program is stored in the non-transitory computer readable storage medium; and when the computer program is executed by a processor, the steps of the target-oriented seismic acquisition method according to claim 1 are implemented.

* * * * *